US011023579B1

(12) United States Patent
Wheeler et al.

(10) Patent No.: US 11,023,579 B1
(45) Date of Patent: Jun. 1, 2021

(54) MALICIOUS ACTIVITY DETECTION IN A MEMORY

(71) Applicant: National Technology & Engineering Solutions of Sandia, LLC, Albuquerque, NM (US)

(72) Inventors: Jason W. Wheeler, Albuquerque, NM (US); Tu-Thach Quach, Albuquerque, NM (US); Conrad D. James, Albuquerque, NM (US); James Bradley Aimone, Albuquerque, NM (US); Arun F. Rodrigues, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 457 days.

(21) Appl. No.: 15/367,026

(22) Filed: Dec. 1, 2016

(51) Int. Cl.
| G08B 23/00 | (2006.01) |
| G06F 12/16 | (2006.01) |
| G06F 12/14 | (2006.01) |
| G06F 11/00 | (2006.01) |
| G06F 21/56 | (2013.01) |
| H04L 29/06 | (2006.01) |

(52) U.S. Cl.
CPC .......... G06F 21/562 (2013.01); H04L 63/145 (2013.01); *G06F 21/564* (2013.01); *G06F 2212/1052* (2013.01); *G06F 2212/401* (2013.01)

(58) Field of Classification Search
CPC ................. G06F 21/562; G06F 21/564; G06F 2212/1052; G06F 2212/401; G06F 21/31; H04L 63/145

USPC .................................................... 726/24, 19
See application file for complete search history.

(56) References Cited

U.S. PATENT DOCUMENTS

| 2006/0036874 A1* | 2/2006 | Cockerille | G06F 21/52 |
| | | | 713/187 |
| 2012/0079596 A1* | 3/2012 | Thomas | G06F 21/55 |
| | | | 726/24 |
| 2013/0024936 A1* | 1/2013 | Jakobsson | G06F 21/554 |
| | | | 726/23 |
| 2013/0198152 A1* | 8/2013 | McGhee | H03M 7/3088 |
| | | | 707/693 |
| 2015/0149789 A1* | 5/2015 | Seo | G06F 3/0608 |
| | | | 713/193 |

OTHER PUBLICATIONS

Tal Garfinkel; A Virtual Machine Introspection Based Architecture for Intrusion Detection; ISOC.org:2013; p. 1-16.*
Kaur et al., "Reconstruction Using Compressive Sensing: A Review," International Journal of Advanced Research in Computer and Communication Engineering, vol. 2, Issue 9, Sep. 2013, pp. 3648-3650.

* cited by examiner

*Primary Examiner* — Monjur Rahim
(74) *Attorney, Agent, or Firm* — Yee & Associates, P.C.

(57) ABSTRACT

A method and apparatus for monitoring a volatile memory in a computer system. Samples of compressed data from locations in the volatile memory in the computer system are read. Data in the volatile memory is reconstructed using the samples of compressed data. The data is an image of the volatile memory. The image enables determining whether an undesired process is present in the volatile memory.

16 Claims, 5 Drawing Sheets

MALICIOUS ACTIVITY DETECTION IN A MEMORY

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved computer system and, in particular, to a method and apparatus for detecting malicious activity in a computer system. Still more particularly, the present disclosure relates to a method and apparatus for reading data from a memory in the computer system for use in detecting malicious activity in the memory.

2. Background

Cybersecurity involves protection of computer systems from theft or damage to hardware, software, and information on the computer systems. Cybersecurity may also include preventing disruption or misdirection of services provided by the computer systems. The importance of the cybersecurity has increased with increasing reliance on the computer systems and the Internet to communicate and conduct business.

Cybersecurity analysts typically monitor network traffic, file systems, and active processes for patterns that may be indicative of malicious activity. Volatile memory, however, is generally not monitored for practical reasons. Sampling the volatile memory at a reasonable rate would have a significant performance impact on the computer system. For example, speed of volatile memory access may slow down so much that processes using the volatile memory may not function as desired or function at all.

As a result, this limitation to monitoring the volatile memory has resulted in exploits that exist solely in the volatile memory. Therefore, it would be desirable to have a method and apparatus that take into account at least some of the issues discussed above, as well as other possible issues. For example, it would be desirable to have a method and apparatus that overcome a technical problem with reading data from a volatile memory in protecting a computer system.

SUMMARY

An embodiment of the present disclosure provides a method for monitoring a memory. Samples of compressed data from locations in the memory are read. The samples of compressed data are analyzed for a presence of an undesired process present in the memory.

Another embodiment for the present disclosure provides a method for monitoring a volatile memory in a computer system. Samples of compressed data from locations in the volatile memory in the computer system are read. Data in the volatile memory is reconstructed using the samples of compressed data. The data is an image of the volatile memory. The image enables determining whether an undesired process is present in the volatile memory.

Yet another embodiment of the present disclosure provides a computer system comprising a memory and a controller in communication with the memory. Data is present in the memory. The controller is configured to read samples of compressed data from locations in the memory and analyze the samples of compressed data for a presence of an undesired process in the memory.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that reading data from a memory is often impractical for purposes of detecting undesired processes. For example, when the memory is in use in a computer system to run processes, reading the data from the memory to look for malware is impractical because of a reduction in performance of the memory caused by reading the data to perform an analysis. Reading the data from the memory may also be impractical because it takes too long to sample an entire dataset and the data in the memory may have changed before it has been fully sampled.

Thus, the illustrative embodiments provide a method and apparatus for monitoring a memory. The memory may be either a volatile memory, a non-volatile memory, or the memory may have parts that are volatile and parts that are non-volatile. Samples of compressed data are read from locations in the memory. These samples of compressed data are analyzed for a presence of an undesired process in the memory. The undesired process is often a malware.

Figure 1:
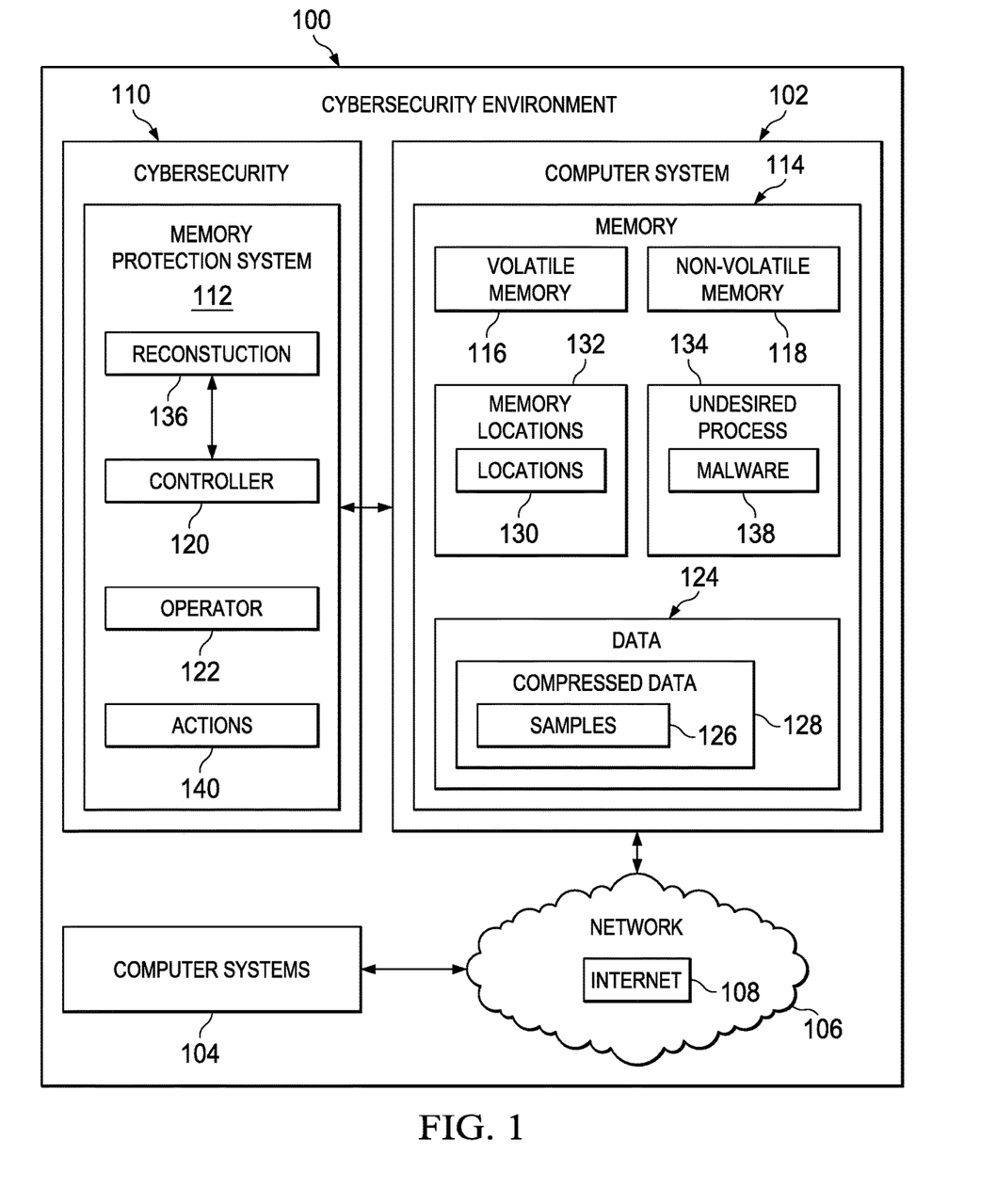
FIG. 1 is an illustration of a block diagram of a cybersecurity environment in accordance with an illustrative embodiment.

With reference now to the figures and, in particular, with reference to FIG. 1, an illustration of a block diagram of a cybersecurity environment is depicted in accordance with an illustrative embodiment. As depicted, cybersecurity environment 100 includes computer system 102. Computer system 102 is connected to computer systems 104 over network 106. Network 106 is Internet 108 in this example.

Computer system 102 and computer systems 104 are physical hardware systems and each computer system includes one or more data processing systems. When more than one data processing system is present in a particular computer system, those data processing systems are in communication with each other using a communications medium. The data processing systems may be selected from at least one of a computer, a server computer, a tablet, or some other suitable data processing system. The communications medium is a network. The network includes at least one of wired connections or wireless connections that connect the different data processing systems to each other. The network used in computer system 102 and computer systems 104 may include at least one of an intranet, a local area network (LAN), a wide area network (WAN), or some other suitable type of network that is in communication with network 106.

In this illustrative example, cybersecurity 110 is present for computer system 102. Cybersecurity 110 monitors computer system 102 to protect computer system 102 from at least one of undesired intrusions, misdirection of services, or denial of services provided by computer system 102. Cybersecurity 110 is a hardware system that may also include software. Although cybersecurity 110 is shown in this functional block diagram as a separate component from computer system 102, cybersecurity 110 may be integrated as part of computer system 102.

For example, cybersecurity 110 includes memory protection system 112 that protects memory 114 in computer system 102. As depicted, memory 114 includes at least one of volatile memory 116 or non-volatile memory 118. Volatile memory 116 may include at least one of a dynamic random access memory, a static random access memory, or some other suitable type of memory.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, memory protection system 112 includes a number of different components. As depicted, the components include controller 120 and operator 122.

As depicted, controller 120 is a hardware component and may also include software that controls memory 114. This control includes at least reading data 124 from memory 114. The control also includes writing, isolating portions of memory 114, partitioning memory 114, or other operations involving memory 114.

In this illustrative example, controller 120 reads samples 126 of compressed data 128 from locations 130 in memory 114. As depicted, data 124 includes compressed data 128. In this example, data 124 may be comprised entirely of compressed data 128. In this illustrative example, compressed data 128 may be arranged in a number of different ways. For example, compressed data 128 may be sparse within memory 114. In this case, compressed data 128 may be present only in some portions of memory 114.

In another example, compressed data 128 may be structured within memory 114. With compressed data 128 in a structure, a repeating pattern of compressed data 128 may be present. In this manner, the collection of some of compressed data 128 may be sufficient to reconstruct all of compressed data 128 within memory 114. In some cases, only a portion of compressed data 128 in memory 114 may need to be reconstructed.

Locations 130 are some or all of memory locations 132 in memory 114. In the depicted example, all of memory locations 132 do not have to be read. Locations 130 may be selected such that performance of memory 114 does not fall below a desired level.

As depicted, controller 120 analyzes samples 126 of compressed data 128 from locations 130 in memory 114. This analysis is performed to determine whether undesired process 134 is present in memory 114. The analysis is performed using samples 126 of compressed data 128.

For example, controller 120 may reconstruct data 124 in memory 114 using samples 126 of compressed data 128 to form reconstruction 136 of data 124 in memory 114. Reconstruction 136 takes various forms. For example, reconstruction 136 may be selected from at least one of a memory map, an image, a table of compressed data 128 and addresses, or some other form that identifies data 124 in memory 114.

In this illustrative example, reconstruction 136 may be created by controller 120 using reconstruction processes typically employed for reconstructing signals or image data generated by camera systems. For example, reconstruction 136 may be generated from samples 126 of compressed data 128 in memory 114 using a signal reconstruction process that uses the Shannon sampling error. As another example, reconstruction 136 may be generated from samples 126 of compressed data 128 in memory 114 based on sparsity and incoherence of signals of interest. These and other techniques used for reconstructing signals for images from image data may be used by controller 120 to generate reconstruction 136.

With reconstruction 136, controller 120 may determine whether undesired process 134 is present in memory 114. In yet another illustrative example, the determination of whether undesired process 134 is present in memory 114 may be performed by using samples 126 of compressed data 128 without reconstructing data 124 in memory 114. In other words, samples 126 of compressed data 128 do not have to be processed to reconstruct compressed data 128 in memory 114. Instead, controller 120 may perform analysis on samples 126 of compressed data 128 to determine whether undesired process 134 is present by using processes or techniques that do not need reconstruction 136.

In this example, undesired process 134 is malware 138. Undesired process 134 may be selected from one of a virus, a backdoor, a Trojan horse, a worm, a root kit, an evasion process, a spyware, an adware, or some other undesired type of software. As depicted, undesired process 134 may be for some or all of malware 138. In other words, a portion of malware 138 may be located in memory 114 while another portion of malware 138 may be located somewhere else within computer system 102.

Operator 122 performs a set of actions 140 when undesired process 134 is present in memory 114. As used herein, "a set of", when used with reference to items, means one or more items. For example, "a set of actions 140" is one or more of actions 140.

In this example, operator 122 may take various forms. In this illustrative example, operator 122 is from at least one of a virus scanner, a human operator, a neural network, an artificial intelligence system, an expert system, or some other entity. In other words, operator 122 may include more than one entity. The set of actions 140 is selected from at least one of shutting down memory 114, shutting down a portion of memory 114, isolating memory 114, isolating the portion of memory 114, generating an alert, performing an additional analysis, or initiating a scan of computer system 102 in which memory 114 is located.

Controller 120 may be implemented in software, hardware, firmware, or a combination thereof. When software is used, the operations performed by controller 120 may be implemented in program code configured to run on hardware, such as a processor unit. When firmware is used, the operations performed by controller 120 may be implemented in program code and data and stored in persistent memory to run on a processor unit. When hardware is employed, the hardware may include circuits that operate to perform the operations in controller 120.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions are present that overcome a technical problem with reading data from a volatile memory in protecting a computer system. As a result, one or more technical solutions may provide a technical effect in which malicious activity from undesired process 134 may be detected in memory 114 without reducing performance of memory 114 below a desired level. The desired level may be based on a specification or a metric with respect to the performance of memory 114. The detection of undesired process 134 enables performing a set of actions 140 to prevent undesired process 134 from causing an undesired operation of computer system 102.

As a result, computer system 102 operates as a special purpose computer system in which controller 120 in computer system 102 enables monitoring of memory 114 without reducing the performance of memory 114 below a desired level. Further, controller 120 may also enable the monitoring of memory 114 at a desired rate. In particular, controller 120 transforms computer system 102 into a special purpose computer system as compared to currently available general computer systems that do not have controller 120.

Figure 2:
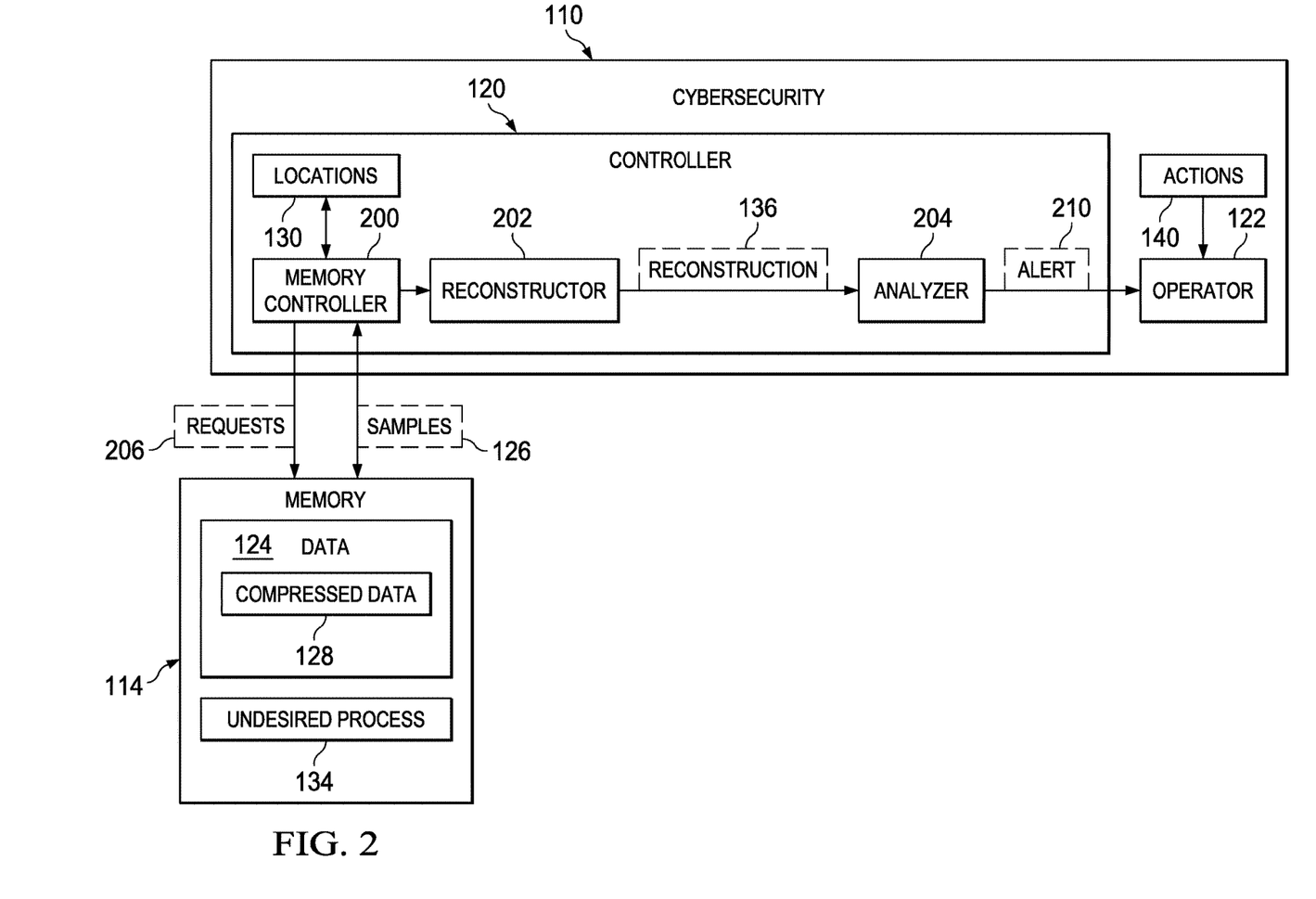
FIG. 2 is an illustration of a block diagram of cybersecurity in accordance with an illustrative embodiment.

With reference now to FIG. 2, an illustration of a block diagram of cybersecurity is depicted in accordance with an illustrative embodiment. In the illustrative examples, the same reference numeral may be used in more than one figure. This reuse of a reference numeral in different figures represents the same element in the different figures. In this illustrative example, an example of one implementation of cybersecurity 110 is depicted.

In the illustrative example, controller 120 may be implemented using a number of different components. As depicted, cybersecurity 110 includes memory controller 200, reconstructor 202, and analyzer 204.

Memory controller 200 reads memory 114. Memory controller 200 is a hardware component that may be implemented using the available memory controller for memories.

In this example, memory controller 200 sends requests 206 to memory 114. Requests 206 include memory addresses to read data 124 from locations 130. In response to requests 206, samples 126 of compressed data 128 are returned to memory controller 200.

As depicted, samples 126 are sent to reconstructor 202. Reconstructor 202 creates reconstruction 136 of memory 114 using samples 126.

In this illustrative example, analyzer 204 receives reconstruction 136 from reconstructor 202. Analyzer 204 analyzes reconstruction 136 to determine whether undesired process 134 is present. Analyzer 204 may be implemented using any currently used techniques for identifying undesired processes such as malware 138 in FIG. 1. For example, analyzer 204 may use techniques such as signature-based detection, heuristics, or other techniques used to detect malware 138.

If undesired process 134 is detected in memory 114, alert 210 is sent to operator 122. Alert 210 may be an indication that undesired process 134 is present in memory 114. In other illustrative examples, alert 210 also may include other information including at least one of a location for undesired process 134 in memory 114, an identification of undesired process 134, or other suitable types of information.

With alert 210, operator 122 may perform a set of actions 140. In this manner, detection and handling of undesired process 134 in memory 114 may be performed in a manner that does not reduce the performance of memory 114 below a desired level.

In other illustrative examples, the use of reconstructor 202 is optional. For example, samples 126 may be analyzed to detect undesired process 134 without needing reconstruction 136 of memory 114.

The illustrations of cybersecurity environment 100 and the different components in FIGS. 1-2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in FIG. 1, network 106 may take other forms than Internet 108. For example, network 106 may be an intranet, a local area network, a wide area network, or some other type of network that connects computer system 102 and computer systems 104 to each other. In another example, other functions may be implemented in memory controller 200 in FIG. 2. For example, in FIG. 2, functions from at least one of reconstructor 202 or analyzer 204 may be implemented within memory controller 200.

Figure 3:
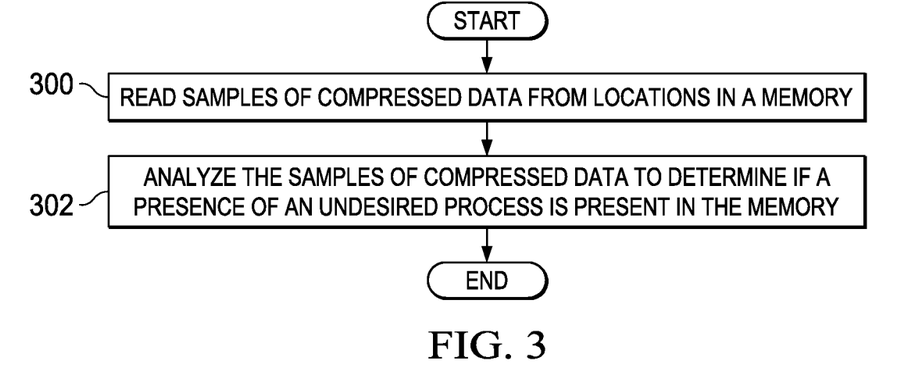
FIG. 3 is an illustration of a flowchart of a process for monitoring a memory in accordance with an illustrative embodiment.

Turning next to FIG. 3, an illustration of a flowchart of a process for monitoring a memory is depicted in accordance with an illustrative embodiment. The process in FIG. 3 may be implemented in controller 120 in FIGS. 1-2.

The process begins by reading samples of compressed data from locations in a memory (step 300). The process analyzes the samples of compressed data to determine if a presence of an undesired process is present in the memory (step 302) with the process terminating thereafter.

Figure 4:
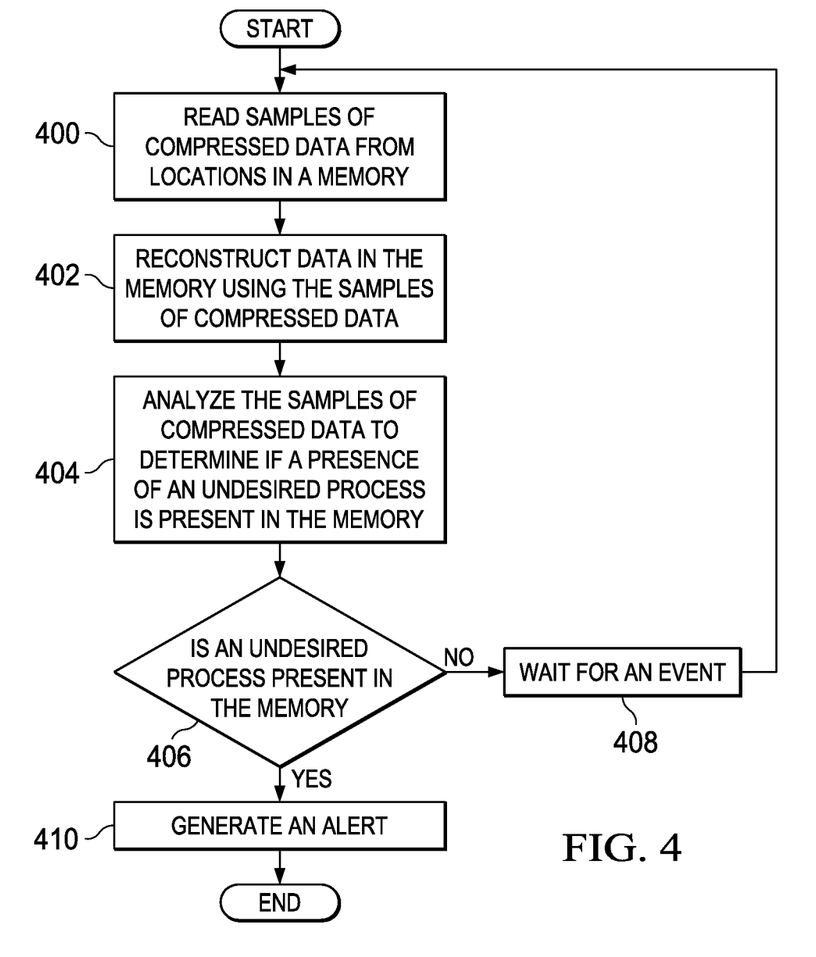
FIG. 4 is an illustration of a more detailed flowchart of a process for monitoring a memory in accordance with an illustrative embodiment.

Turning to FIG. 4, an illustration of a more detailed flowchart of a process for monitoring a memory is depicted in accordance with an illustrative embodiment. The process in FIG. 4 may be implemented in controller 120 in FIGS. 1-2.

The process begins by reading samples of compressed data from locations in a memory (step 400). The process then reconstructs data in the memory using the samples of compressed data (step 402).

Next, the process analyzes the samples of compressed data to determine if a presence of an undesired process is present in the memory (step 404). A determination is made as to whether the undesired process is present in the memory using the data reconstructed using the samples of compressed data (step 406). If the undesired process is not present, the process waits for an event (step 408).

The event in step 408 may be a periodic event or a non-periodic event. For example, if the event is a periodic event, the event is one that occurs after some period of time that may be measured by an expiration of a timer. A non-periodic event may be, for example, a command or some other signal that is received to analyze the memory. When the event occurs, the process returns to step 400.

With reference again to step 406, if a determination is made that the undesired process is present in the memory, the process generates an alert (step 410). The process terminates thereafter. The alert is sent to an operator. The operator may then perform a set of actions in response to determining that the undesired process is present in the memory.

Figure 5:
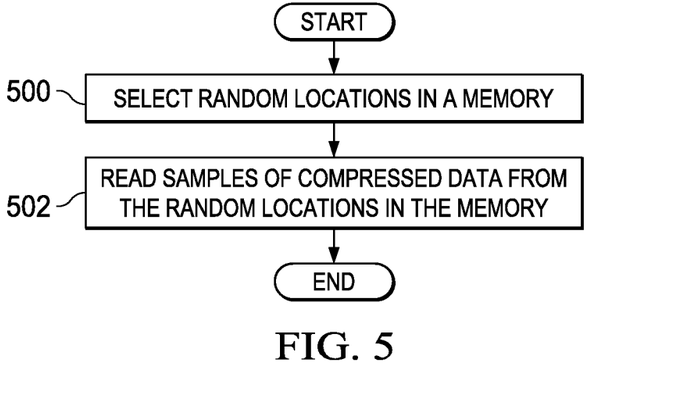
FIG. 5 is an illustration of a flowchart of a process for reading samples of compressed data in accordance with an illustrative embodiment.

With reference to FIG. 5, an illustration of a flowchart of a process for reading samples of compressed data is depicted in accordance with an illustrative embodiment. The process illustrated in FIG. 5 may be implemented in controller 120 in FIGS. 1-2.

The process begins by selecting random locations in a memory (step 500). The process reads samples of compressed data from the random locations in the memory (step 502). The process terminates thereafter. In this example, a first number of the random samples is less than a second number of bits in the first number of random samples.

Figure 6:
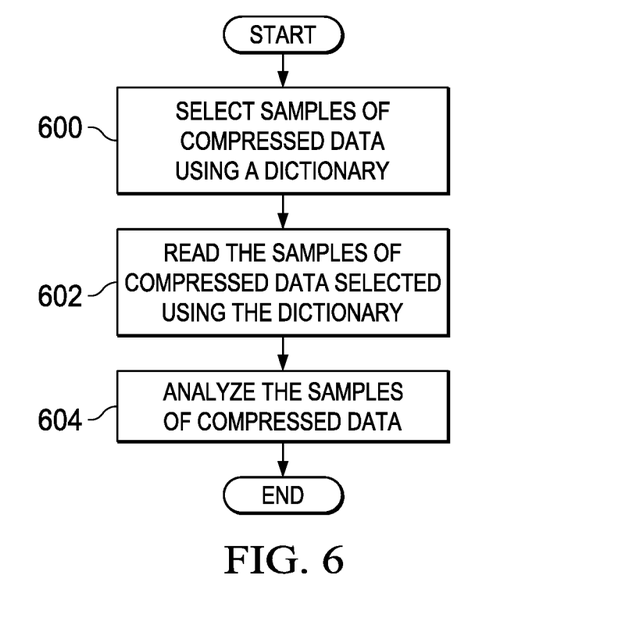
FIG. 6 is another illustration of a flowchart of a process for reading samples of compressed data in accordance with an illustrative embodiment.

Turning now to FIG. 6, another illustration of a flowchart of a process for reading samples of compressed data is depicted in accordance with an illustrative embodiment. The process illustrated in FIG. 6 may be implemented in controller 120 in FIGS. 1-2.

The process begins by selecting samples of compressed data using a dictionary (step 600). The dictionary in step 600 is a data structure that identifies locations that should be read. The dictionary may be created from analyzing a group of memory files from a group of memories.

As used herein, "a group of", when used with reference to items, means one or more items. For example, "a group of memories" is one or more memories.

The analysis of the samples selected in step 600 allows for identifying at least one of patterns or structure in the data. The manner in which bits are arranged in a memory is not random in the illustrative examples. Repeating patterns for similar types of files or processes are often present. By identifying these patterns from observing the data from memories, the dictionary can exploit these patterns to be more effective in sampling fewer locations while still getting a desired accuracy in reconstructions.

In the illustrative example, the dictionary may be generated by identifying at least one of sparsity of uncompressed data, structure of uncompressed data, or other observations about the manner in which the data is stored in the memories. An analysis of the group of memory files may be used to predict what locations are most likely to provide sufficient samples of compressed data to allow for reconstruction of the data in the memory using the samples.

The process then reads the samples of compressed data selected using the dictionary (step 602). Next, the process analyzes the samples (step 604). In step 604, the samples are from several memories. Step 604 may be performed as part of a separate offline process or online with the sampling process. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 7:
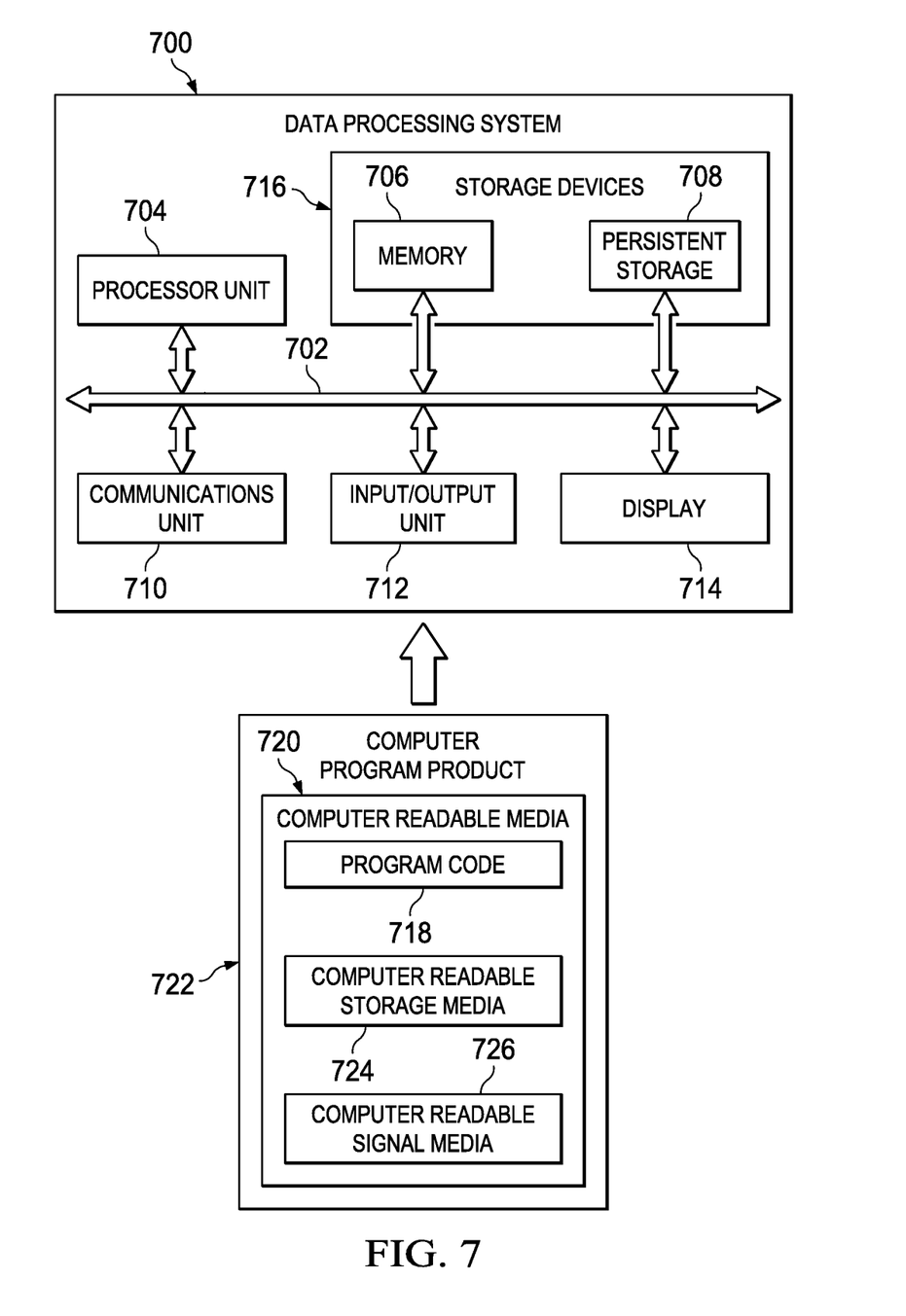
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement data processing systems in computer system 102, computer systems 104, and cybersecurity 110. In this illustrative example, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a solid state hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Thus, the illustrative examples provide one or more technical solutions that overcome a technical problem with reading data from a memory in protecting a computer system. As a result, one or more technical solutions may provide a technical effect in which malicious activity from an undesired process may be detected in the memory without reducing performance of the memory below a desired level. The desired level of the performance may be based on a specification or metric with respect to the performance of the memory. The detection of the undesired process enables performing a set of actions to prevent the undesired process from causing an undesired operation of the computer system.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for monitoring a volatile memory, the method comprising:
   selecting random locations in the volatile memory, wherein the random locations in the volatile memory are fewer than all of the locations in the volatile memory, and wherein the random locations are selected by using a dictionary created from analyzing a group of memory files from a group of memories to identify patterns in how data is arranged in memory for similar types of files or processes;
   reading samples of compressed data from the random locations in the volatile memory; and
   analyzing the samples of compressed data to determine whether an undesired process is present in the volatile memory using the samples of compressed data without reconstructing data in the memory.

2. The method of claim 1, wherein the analyzing step comprises:

reconstructing data in the memory using the samples of compressed data.

3. The method of claim 2, wherein the analyzing step comprises:
   determining whether the undesired process is present in the memory using the data reconstructed using the samples of compressed data.

4. The method of claim 1 further comprising:
   performing a set of actions when the undesired process is present.

5. The method of claim 4, wherein the set of actions is selected from at least one of shutting down the memory, shutting down a portion of the memory, isolating the memory, isolating the portion of the memory, generating an alert, or initiating a scan of a computer system in which the memory is located.

6. The method of claim 4, wherein the set of actions is performed by at least one of a virus scanner, a human operator, a neural network, an artificial intelligence system, or an expert system.

7. The method of claim 1, wherein a controller reads the samples of compressed data.

8. The method of claim 1, wherein the undesired process is for one selected from one of a virus, a Trojan horse, a worm, a root kit, a backdoor, an evasion process, a spyware, or an adware.

9. The method of claim 1, wherein the memory is selected from one of a dynamic random access memory and a static random access memory.

10. A method for monitoring a volatile memory in a computer system, the method comprising:
    selecting random locations in the volatile memory, wherein the random locations in the volatile memory are fewer than all of the locations in the volatile memory, and wherein the random locations are selected by using a dictionary created from analyzing a group of memory files from a group of memories to identify patterns in how data is arranged in memory for similar types of files or processes;
    reading samples of compressed data from the random locations in the volatile memory in the computer system;
    reconstructing data in the volatile memory using the samples of compressed data, wherein the data is an image of the volatile memory; and
    using the image of the volatile memory to determine whether an undesired process is present in the volatile memory.

11. The method of claim 10, wherein the volatile memory is selected from one of a dynamic random access memory and a static random access memory.

12. A computer system comprising:
    a volatile memory, wherein data is present in the volatile memory; and
    a controller in communication with the volatile memory, wherein the controller is configured to:
        select random locations in the volatile memory, wherein the random locations in the memory are fewer than all of the locations in the volatile memory, and wherein the random locations are selected by using a dictionary created from analyzing a group of memory files from a group of memories to identify patterns in how data is arranged in memory for similar types of files or processes,
        read samples of compressed data from the random locations in the volatile memory, and
        analyze the samples of compressed data for to determine whether an undesired process is present in the volatile memory using the samples of compressed data without reconstructing the data in the memory.

13. The computer system of claim 12, wherein in analyzing the samples of compressed data, the controller is configured to reconstruct the data in the memory using the samples of compressed data.

14. The computer system of claim 13, wherein in analyzing the samples of compressed data, the controller is configured to determine whether the undesired process is present in the memory using the data reconstructed using the samples of compressed data.

15. The computer system of claim 12, wherein the undesired process is for one of a malware, a virus, a Trojan horse, a root kit, a backdoor, a spyware, a worm, and an adware.

16. The computer system of claim 12, wherein the memory is selected from one of a dynamic random access memory and a static random access memory.

* * * * *